US006178975B1

(12) United States Patent
Aoki (10) Patent No.: US 6,178,975 B1
(45) Date of Patent: Jan. 30, 2001

(54) WASTE WATER CLASSIFYING RECOVERY APPARATUS IN WAFER CLEANING SYSTEM

(75) Inventor: Shoji Aoki, Fukushima (JP)

(73) Assignee: Shin-Etsu Handotai Co., Ltd., Tokyo (JP)

(*) Notice: Under 35 U.S.C. 154(b), the term of this patent shall be extended for 0 days.

(21) Appl. No.: 09/305,199

(22) Filed: May 5, 1999

(30) Foreign Application Priority Data

May 13, 1998 (JP) .................................... 10-130343

(51) Int. Cl.$^7$ ........................................... B08B 13/00
(52) U.S. Cl. .................... 134/57 R; 134/96.1; 134/902
(58) Field of Search .................. 134/56 R, 57 R, 134/60, 96.1, 113, 902

(56) References Cited

U.S. PATENT DOCUMENTS

| 3,896,828 | * | 7/1975 | Shindo et al. | 134/57 R |
| 4,325,746 | * | 4/1982 | Popplewell et al. | 134/57 R X |
| 5,275,184 | * | 1/1994 | Nishizawa et al. | 134/57 R |
| 5,706,841 | * | 1/1998 | Werre et al. | 134/113 X |
| 5,845,660 | * | 12/1998 | Shindo et al. | 134/56 R |

FOREIGN PATENT DOCUMENTS

| 2 128 176 | 4/1984 | (GB) . |
| 2 208 856 | 4/1989 | (GB) . |

OTHER PUBLICATIONS

WPI Abstract of DE 41 15 686, published Apr. 2, 1992.
WPI Abstract of DE 40 06 689, published Aug. 1, 1991.
WPI Abstract of JP 60–129177, published Jul. 10, 1985.
WPI Abstract of JP 58–101779, published Jun. 17, 1983.
Maeda, K. (1990) English Translation of "4.2.5. Illustration of Total Cleaning Apparatus", *VLSI Process System Handbook* p. 226–228.

* cited by examiner

Primary Examiner—Philip R. Coe
(74) Attorney, Agent, or Firm—Evenson, McKeown, Edwards & Lenahan, P.L.L.C.

(57) ABSTRACT

In a single wafer cleaning system of a single tank type in which wafers are one by one sprayed with chemical liquid and rinse water used in a successive order, not only can waste water is recovered while being classified into chemical liquid waste water and rinse waste water, but also the rinse waste water is recovered while being classified into cloudy rinse waste water and clean rinse waste water. A waste water classifying recovery apparatus comprises: chemical liquid waste water lines 15, 16 and a rinse waste water line 17 connected to a treatment tank 1; chemical liquid/rinse selective distributor automatic valves 10, 11, 12 respectively provided on the lines; a concentration meter sensor 18 for detecting a concentration of the rinse waste water on the rinse waste water line 17 downstream from the distributor automatic valve 12; a cloudy rinse waste water line 17a and a clean rinse waste water line 17b branched from the rinse waste water line 17 downstream from the concentration meter sensor 18; and cloudy/clean rinse distributor valves 13, 14 respectively provided on the waste water lines 17a, 17b; wherein the distributor automatic valve 13 on the cloudy rinse waste water line 17a or the distributor automatic valve 14 on the clean rinse waste water line 17b is opened according to a detection signal of the concentration meter sensor 18, so that the cloudy rinse waste water or the clean rinse waste water is separately drained.

2 Claims, 6 Drawing Sheets

WASTE WATER CLASSIFYING RECOVERY APPARATUS IN WAFER CLEANING SYSTEM

BACKGROUND OF THE INVENTION

1. Field of the Invention

The present invention relates to a waste water classifying recovery apparatus for recovering waste water while classifying in a single wafer cleaning system in which wafers are cleaned especially one wafer at a time and particularly to a waste water classifying recovery apparatus in a wafer cleaning system in which rinse (cleaning with pure water) waste water after cleaning can be classified into cloudy rinse waste water and clean rinse waste water for recovery.

2. Description of the Prior Art

Generally, a wafer cleaning system of a multistage batch type or a single tank (bath or container) type has well been known and waste water classifying recovery means are different between both types.

Figure 4:
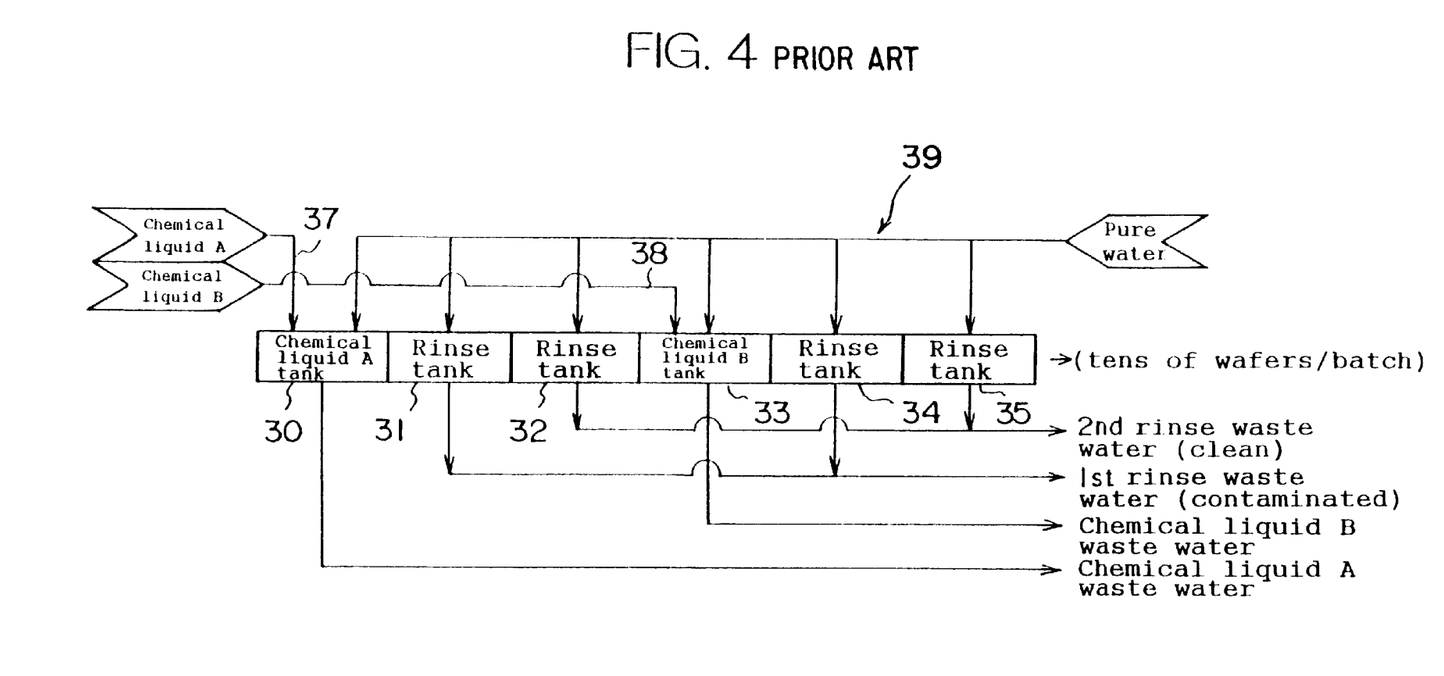
FIG. 4 is a conceptual representation of a waste water classifying recovery method of a conventional wafer cleaning system of a multistage batch type.

The wafer cleaning system of a multistage batch type, for example as shown in FIG. 4, comprises: a chemical liquid A tank 30 (bath); rinse tanks (baths) 31, 32; a chemical liquid B tank 33; and rinse tanks 34, 35, wherein chemical liquid A and chemical liquid B are respectively supplied to the chemical liquid A tank 30 and the chemical liquid B tank 33 through a chemical liquid A supply line 37 and a chemical liquid B supply line 38, while rinse water (pure water or ultrapure water) is supplied to all the tanks through a rinse water supply line 39. A transport robot moves a carrier in which many wafers are included sequentially through the chemical liquid A tank 30; the rinse tanks 31, 32; the chemical liquid B tank 33, the rinse tanks 34, 35 and the like so that the wafers are sequentially immersed into the tanks batchwise.

In a cleaning system of this type, waste water (including waste liquid, hereinafter same as this) can be recovered from each tank while classifying. That is, the chemical liquid A waste water is recovered from the chemical liquid A tank 30, the chemical liquid B waste water is recovered from the chemical liquid B tank 33, first rinse (cloudy rinse) waste water from the rinse tanks 31, 34 and second rinse (clean rinse) waste water from the rinse tanks 32, 35.

Figure 5:
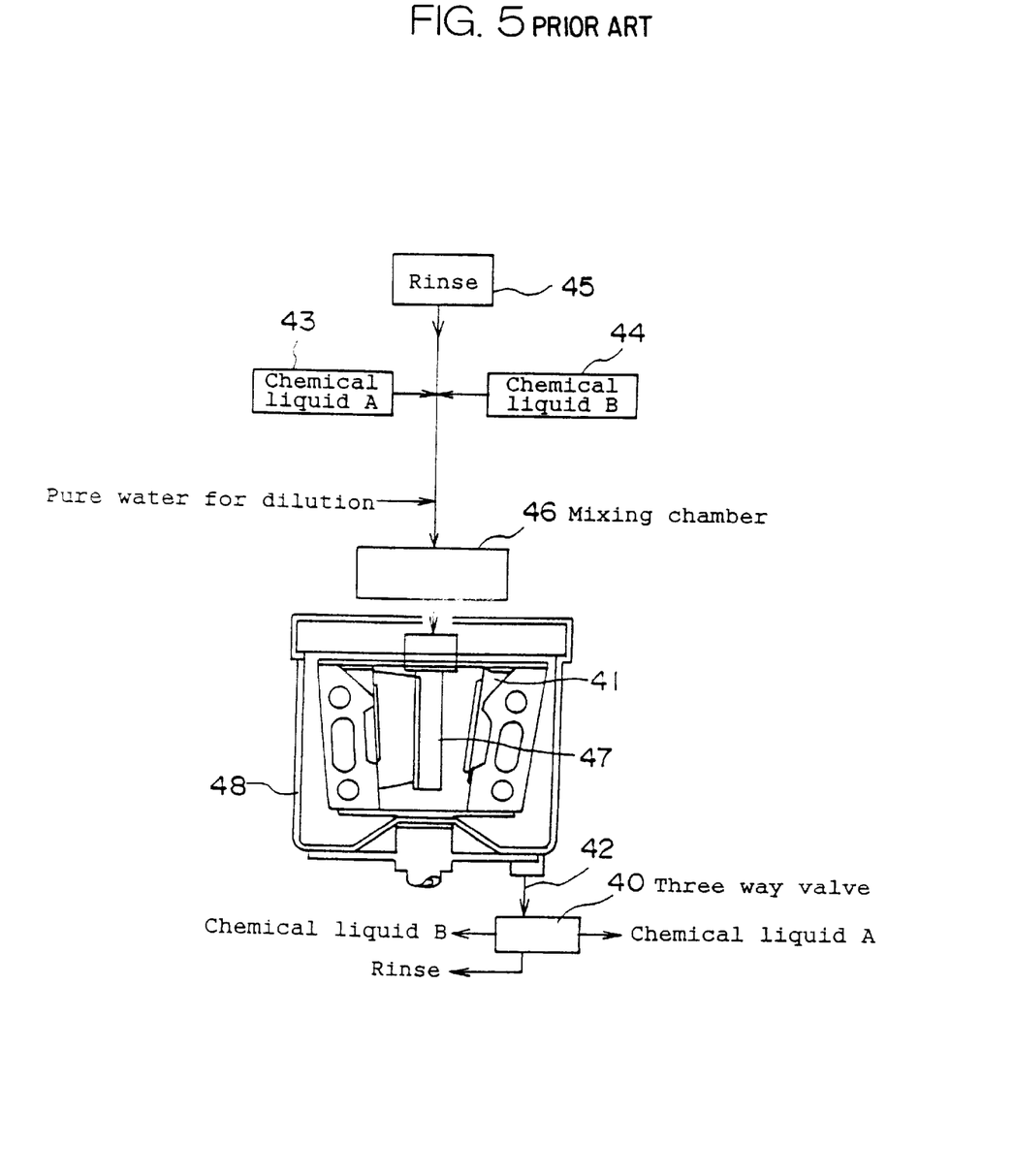
FIG. 5 is a conceptual representation of a waste water classifying recovery method of a conventional wafer cleaning system of a single tank batch type.

A wafer cleaning system of a single tank batch type, as shown in FIG. 5, has been proposed (see "VLSI Process System Handbook," published by Kohgyo Chosakai Co., Tokyo), in which chemical liquid A 43, chemical liquid B 44 and rinse water 45 are selectively supplied to a cleaning tank (container or vessel) 48 through a mixing chamber 46, wafers are placed in a cassette 41 in plural number and the cassette 41 are revolved in the cleaning tank 48 by a rotary shaft 47, so that the wafers are cleaned in a immersion treatment.

In a wafer cleaning system of this type, a waste water (drain) line 42 is provided with a three way valve 40 and the like, and the three way valve 40 is operated for draining in each of timings of change of cleaning by the chemical liquids A, B and the rinse water, so that chemical liquid A waste water, chemical liquid B waste water and rinse waste water are classified and recovered.

Figure 6:
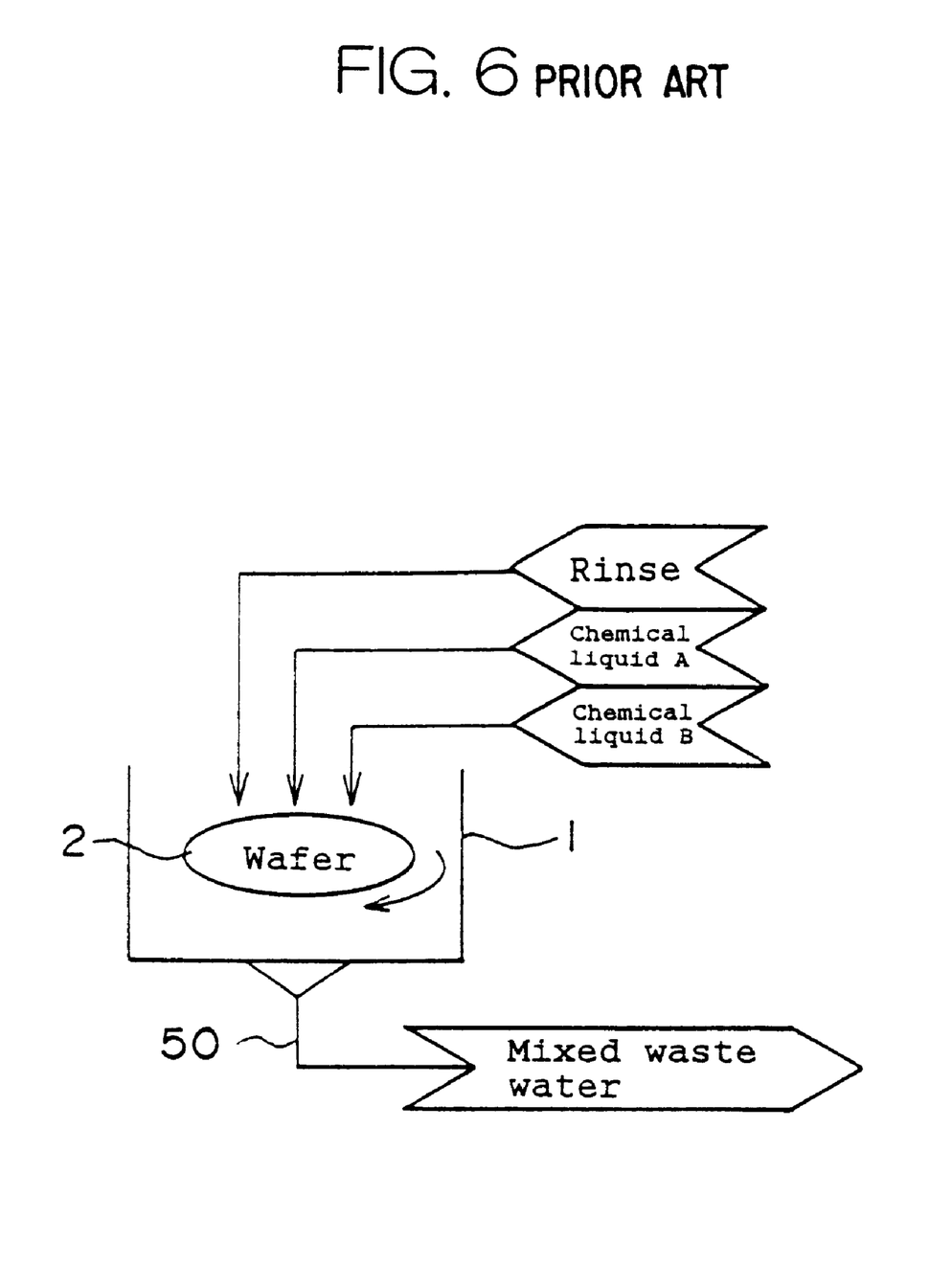
FIG. 6 is a conceptual representation of a waste water classifying recovery method of a conventional single wafer cleaning system of a single tank type.

On the other hand, as shown in FIG. 6, a single wafer cleaning system of a single tank (container or vessel) type has been known, in which wafers 2 are placed in a treatment tank 1 one wafer at a time and the wafers sequentially receive spray of the chemical liquids A, B and the rinse water. In a wafer cleaning system of this single tank type, since the wafers are sequentially sprayed with the chemical liquids and the rinse water one wafer at a time, classifying recovery of waste water is hard to be effected with a single waste water line 50 and mixed waste water of chemical liquids and rinse water has conventionally been collected.

The wafer cleaning system of a multistage batch type is advantageous in waste water processing, since each waste water in chemical liquid and rinse systems can be recovered while being classified, whereas there has been a tendency that as a wafer diameter is increased, a wafer cleaning system of a single tank type becomes adopted, since an installation space for tanks is increased.

As shown in FIG. 5, a wafer cleaning system of a single tank type is harder for classifying recovery than a wafer cleaning system of a multistage batch type because all the waste waters are recovered through the single waste pipe (drain) line 42, but since a wafer cleaning system of a single tank type in which a cassette is immersed in a treatment tank is allowed to have a comparatively long time in cleaning, classifying recovery can be effected by operating a three way valve 40 in synchronization with each step of cleaning.

However, in a single wafer cleaning system of a single tank type, as shown in FIG. 6, in which wafers are sequentially sprayed with chemical liquid and rinse water one wafer at a time, since each cleaning time for a wafer is short (on the order of 1 to 3 minutes) and therefore, timing in waste water recovery is hard to be correctly matched, there has been much of difficulty in classifying recovery of waste water from the single common waste water line 50. Therefore, there has conventionally been no way but to recover mixed waste water of chemical liquid and rinse water: classifying recovery of waste water into chemical liquid and rinse water, and further classifying recovery of the rinse water into cloudy rinse waste water and clean rinse waste water have been very hard. Especially, when classifying recovery of waste water into cloudy rinse waste water and clean rinse waste water is impossible, a trouble arises in purification and recycling of waste water and there has remained a problem that reasonable water utilization cannot be achieved.

SUMMARY OF THE INVENTION

The present invention has been made in light of such problems and it is an object of the present invention to provide a waste water classifying recovery apparatus in a single wafer cleaning system of a single tank (container or vessel) type, in which not only classifying recovery of waste water into chemical liquid waste water and rinse waste water but classifying recovery of rinse waste water into cloudy (contaminated) rinse waste water and clean rinse waste water can be effected.

In order to achieve such an object, the present invention is directed to a waste water classifying recovery apparatus in a wafer cleaning system of a single tank in which a wafer is cleaned in a single treatment tank while chemical liquid and rinse steps are selectively performed; in more concrete manner, wafers are cleaned in a single treatment tank one by one while chemical liquid and rinse water are selectively sprayed on the wafers, comprises: a common waste water line which is connected to the treatment tank; chemical liquid waste water and rinse waste water lines which are branched from the common waste water line; chemical liquid/rinse selective distributor automatic valves respectively provided on the chemical liquid waste water line and the rinse waste water line; a concentration meter sensor for detecting a concentration of the rinse waste water provided downstream from the distributor automatic valve on the rinse waste water line; and cloudy and clean rinse waste water lines branched from the rinse waste water line downstream from the concentration meter sensor through cloudy/clean rinse distributor automatic valves, wherein the cloudy/clean rinse distributor automatic valves are selectively operated according to a detection signal of the concentration meter sensor and thereby cloudy rinse waste water and clean rinse waste water are separately drained.

It is preferable that, in the present invention, a water quality meter sensor for detecting a water quality of the waste water is provided on the common waste water line; the chemical liquid waste water and rinse waste water lines are branched from the common waste water line downstream from the water quality meter sensor; the chemical/rinse selective distributor automatic valves are respectively provided on the chemical liquid waste water, and rinse waste water lines; and the chemical/rinse selective distributor automatic valves are controlled according to a detection signal of the water quality meter sensor so that one of the chemical liquid waste water line and the rinse waste water line is made conductive and the other is made not conductive.

According to the present invention, since not only classifying recovery of the waste water can be effected into chemical liquid waste water and rinse waste water, but further classifying recovery of the rinse waste water into cloudy and clean rinse waste waters, not only can the cloudy rinse waste water be treated in a waste water processing apparatus, but the clean rinse waste water can be recycled for use as medium grade water and the like.

Marks used in the above figures indicate constituents of the systems and apparatuses in the following manner: 1 indicates; a treatment tank; 2 a wafer; 3 a rinse water supply line; 4 a chemical liquid A supply line; 5 a chemical liquid B supply line; 7 a controller; 9 a common waste water line; 10, 11, 12, 13, 14, 23 distributor automatic valves; 15 a chemical liquid A waste water line; 16 a chemical liquid B waste water line; 17 a rinse waste water line; 17a a cloudy rinse (contaminated rinse) waste water line; 17b a clean rinse waste water line; 18 a concentration meter sensor; 19 a concentration meter monitor; 20 a water quality meter sensor; and 21 a water quality meter monitor.

DETAILED DESCRIPTION OF THE INVENTION

Below, embodiments of the present invention will illustratively described with reference to the accompanying drawings. It is to be understood, however, that sizes, materials, shapes and relative positions of constituents described in the embodiments are not intended to limit the scope of the present invention to the description unless otherwise specified, but provided for exemplary purposes only. The same constituents or those with the same functions of FIG. 6 are indicated by the same marks in the embodiments.

Figure 1:
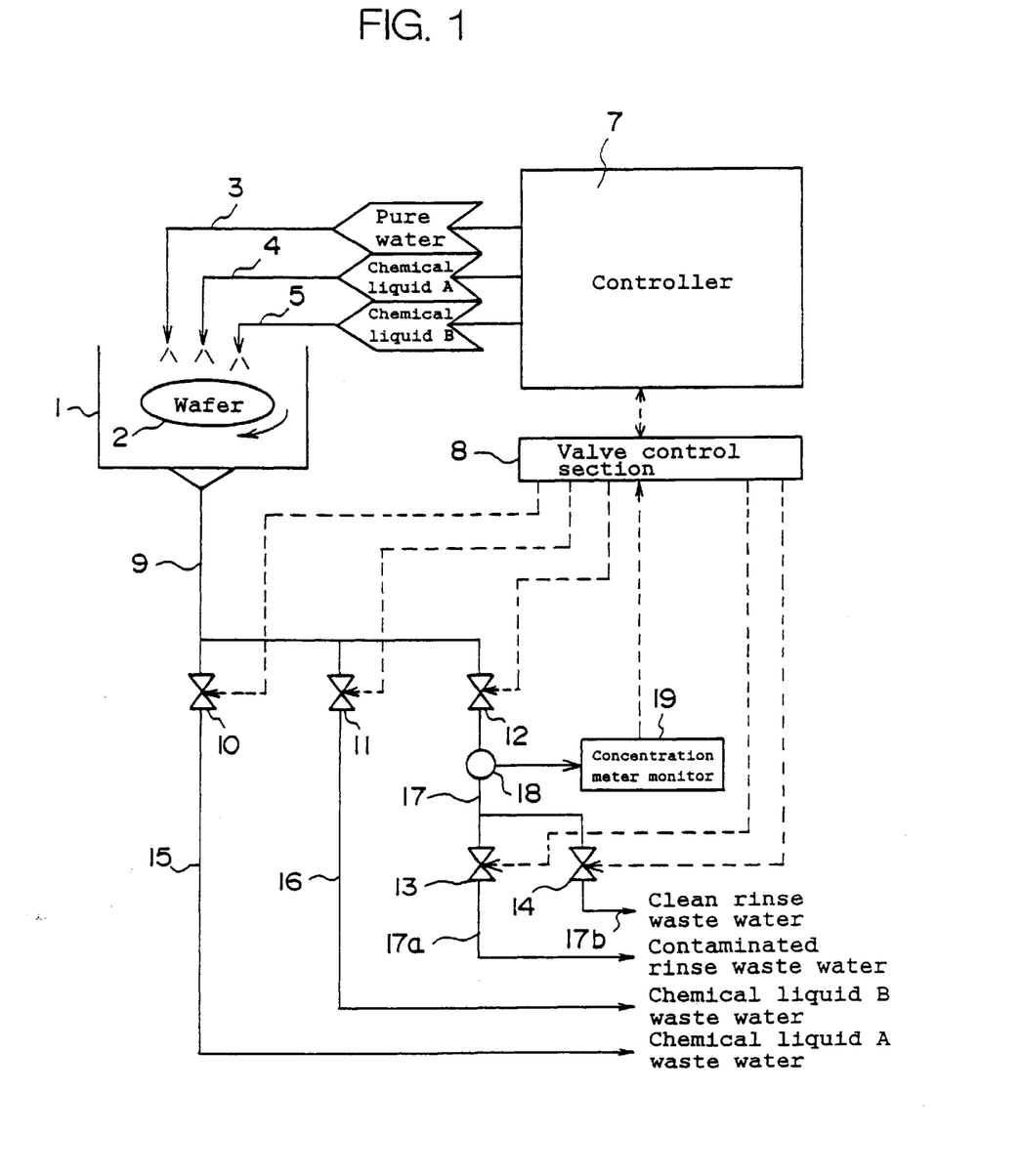
FIG. 1 is a representation of construction of a first embodiment of a waste water classifying recovery apparatus in a wafer cleaning system of the present invention.

FIG. 1 shows the first embodiment of the present invention. A mark 1 indicates a treatment tank (container or vessel) of a wafer cleaning system of a single tank type, wafers 2 are fed one at a time into the treatment tank 1 and a wafer 2 is sequentially cleaned by sprays of chemical liquid and rinse water. The treatment tank 1 is provided with rinse water, chemical liquid A and chemical liquid B respectively through a rinse water supply line 3, a chemical liquid A supply line 4 and a chemical liquid B supply line The supply lines 3, 4, 5 are controlled so as to be conductive (supply) or not (stoppage) by operating electromagnetic valves (not shown) or the like with a controller 7 and the chemical liquids A and B, and rinse water are supplied in predetermined timings.

A common waste water (drain) line 9 is connected to the treatment tank 1 and a chemical liquid A waste water line 15, a chemical liquid B waste water line 16 and a rinse waste water line 17 are branched from the common waste water line 9 through chemical/rinse selective distributor automatic valves 10, 11 and 12. The rinse waste water line 17 is provided with a concentration meter sensor 18 and a detection signal thereof is monitored by a concentration meter monitor 19. The rinse waste water line 17 is divided into branches of a cloudy rinse (contaminated rinse) waste water line 17a and a clean rinse waste water line 17b after a stream flows past the concentration meter sensor 18 and the waste water lines 17a, 17b are respectively provided with cloudy/clean rinse distributor automatic valves 13, 14.

The chemical liquid A, for example ($NH_4OH/H_2O_2$) and the chemical liquid B, for example $HCl/H_2O_2$) are used and diluted solutions which are respectively obtained by diluting both chemical liquids with pure water are sprayed on a wafer 2.

Figure 2:
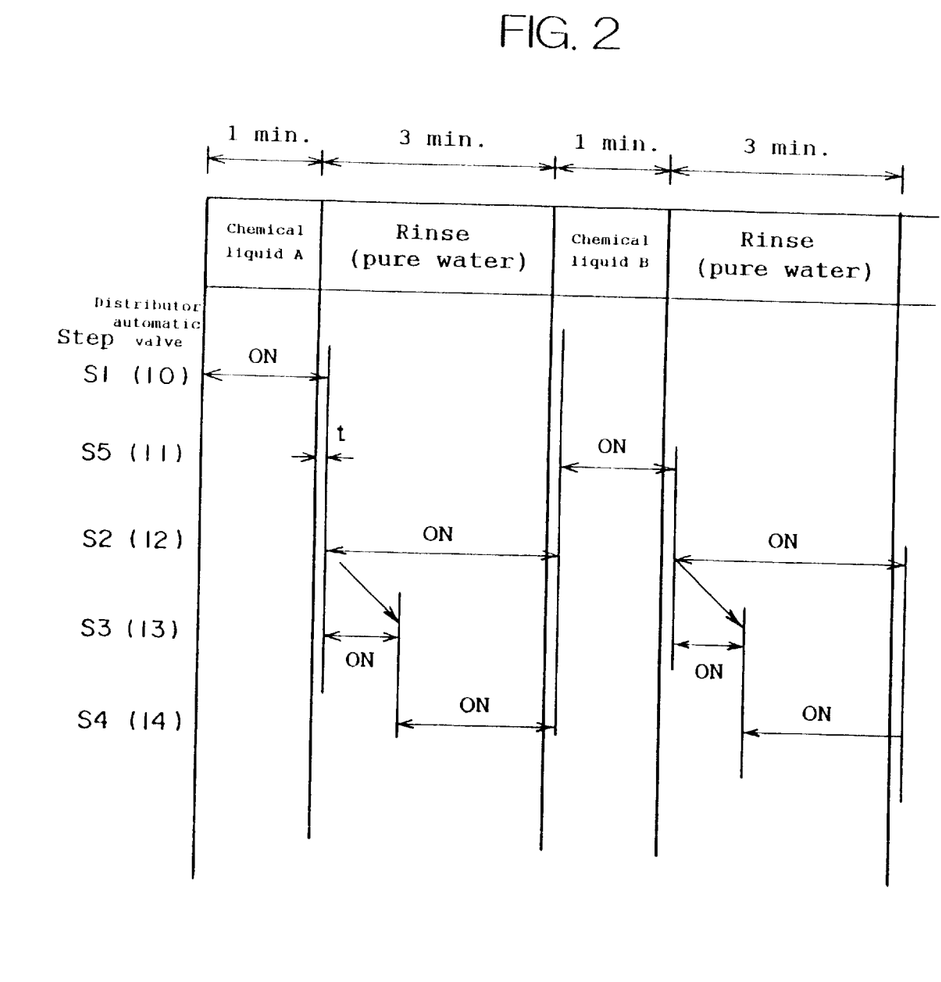
FIG. 2 is a timing chart showing operations of the first embodiment.

Then, operations for classifying recovery will be described with reference to the representation of FIG. 1 and the timing chart of FIG. 2.

At first, the chemical liquid A supply line 4 is made conductive by the controller 7 to supply the chemical liquid A and a wafer 2 is cleaned for 1 minute (this time period of 1 minute is exemplarily given). A signal is sent to a valve control section 8 from the controller 7 at the time of cleaning start by the chemical liquid A and the distributor automatic valve 10 is made conductive by the valve control section 8, so that the chemical liquid A waste water is drained from the chemical liquid A waste water line 15 (step S1).

Then, the rinse water supply line 3 is made conductive to perform rinse cleaning for 3 minutes. The distributor automatic valve 10 is made not conductive at the time of rinse cleaning start (To be exact, there is a time lag t in each of conversions to a state, conductive or not conductive, of the distributor automatic valve corresponding to a length of the waste water line interposed. See FIG. 2) and at the same time, the distributor automatic valve 12 is made conductive to drain rinse water after being used in cleaning from the rinse waste water line 17(step S2).

When a stream flows past the rinse waste water line 17, a rinse concentration (chemical liquid concentration in rinse waste water) is detected by the concentration meter sensor 18 and further monitored by the concentration meter monitor 19. A concentration correlating signal is sent to the valve control section 8 and a signal from the valve control section 8 is in turn sent to the distributor automatic valves 13 and 14, wherein when a cloudy rinse water including a residual water of the first chemical liquid passes, the distributor automatic valve 13 is made conductive so that cloudy rinse water (contaminated water) from the cloudy rinse waste water line 17a is drained (step S3).

When the cloudy rinse water is gradually cleaner and reaches a predetermined cleanliness degree, the distributor automatic valve 13 is made not conductive and the distributor automatic valve 14 is made conductive by a signal from the concentration meter monitor 19 and clean rinse water from the clean rinse waste water line 17b is drained (step S4).

Then, the chemical liquid B supply line 5 is made conductive by the controller 7 to supply the chemical liquid B and a wafer is cleaned for 1 minute. The distributor automatic valve 12 is made not conductive at the time of cleaning start by the chemical liquid B and at the same time, the distributor automatic valve 11 is made conductive to drain chemical liquid B waste water from the chemical liquid B waste water line 16 (step S5).

Then, the rinse water supply line 3 is made conductive to effect cleaning with rinse water for 3 minutes (step S2) and the distributor automatic valve 11 is made not conductive at the time of start of the rinse cleaning and at the same time, the distributor automatic valve 12 is made conductive to drain rinse wafer after being used for cleaning from the rinse waste water line 17. The rinse draining operation at this point is similar to the case of the chemical liquid A (steps S2, S3 and S4).

Figure 3:
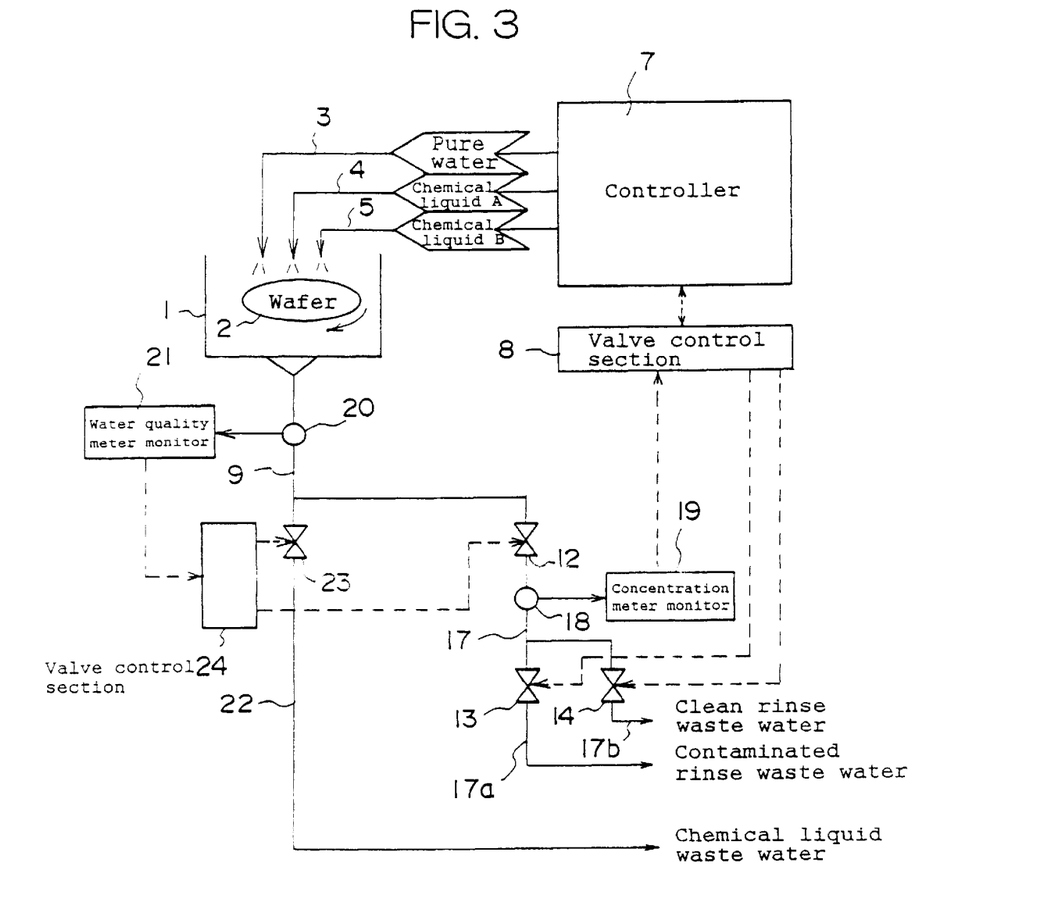
FIG. 3 is a representation of construction of a second embodiment of the present invention.

FIG. 3 shows the second embodiment of the present invention. In the second embodiment, a chemical liquid waste water line 22 and the rinse waste water line 17 are branched from the common waste water line 9 and a distributor automatic valve 23 is provided on a chemical liquid waste water line 22. A construction of the rinse waste water line 17 is same as that of the first embodiment.

A water quality meter sensor 20 is provided on the common waste water line 9 and an electric signal thereof is monitored by a water quality meter monitor 21. A water quality correlating signal from the water quality meter monitor 21 is sent to distributor automatic valves 23, 12 through a valve control section 24. As the water quality meter sensor 20, a sensor, which is well known in the art, such as a conductivity meter for measuring a change in electric conductivity which changes according to water quality in the common waste water line 9 may be used. Besides, a sensor which can sensitively measure a component of chemical liquid may also be used for the same purpose.

When the chemical liquids A and B are drained from the common waste water line 9, the water quality meter sensor 20 detects the water quality and a signal is sent from the valve control section 24 based on an electric signal from the water quality meter monitor 21 to control the distributor automatic valve 23 conductive and the distributor automatic valve 12 not conductive, so that the chemical liquid waste water is drained from the chemical liquid waste water line 22.

When rinse water is drained from the common waste water line 9, the water quality meter sensor 20 detects the water quality in a similar manner and a signal is sent from the valve control section 24 based on an electric signal from the water quality meter monitor 21 to make the distributor automatic valve 23 not conductive but the distributor automatic valve 12 conductive, so that rinse waste water draining from the rinse waste water line 17 is effected. The rinse waste water is detected on a concentration by the concentration meter sensor 18 and thereby recovered while being classified into clean rinse waste water and cloudy rinse waste water in a similar manner to the first embodiment.

In the mean time, chemical liquids which each have a possibility to be used in cleaning (or drained) are not only ($NH_4OH/H_2O_2$) and ($HCl/H_2O_2$), but chemicals such as HF, chromic acid, nitric acid, hydrogen peroxide, ozone water, acetic acid, sodium hydroxide, citric acid and the like, and a mixture thereof which are used in the semiconductor field. For example, a mixture of $HF/H_2O_2$/pure water, a mixture of $NH_4OH/H_2O_2$/pure water, a mixture of $HCl/H_2O_2$/pure water, a mixture of $NaOH/H_2O_2$/pure water, a solution of NaOH/pure water, a solution of citric acid/pure water, a mixture of $HF/HNO_3/CH_3COOH$/pure water, a mixture of $HF/HNO_3$/pure water, a mixture of HF/chromic acid/pure water and the like are used, and it is preferable to classify waste water into chemical liquids described above for recovery when treatments which follow the classifying recovery are considered. However, materials, which each are not a material hard to be treated in waste water processing such as chromium, HF and the like, and which are not problematic in recovery even if the materials are collected in a mixture, do not need classifying recovery at all.

While two kinds of chemical liquids are used in description of the embodiments, similar processing can be applied in the case of one kind, or three kinds or more of chemical liquids.

To sum up, according to present invention, as described above, since distributor automatic valves are respectively provided on a chemical liquid waste water line and a rinse waste water line, a concentration meter sensor for detecting a concentration of rinse waste water is provided downstream from the distributor automatic valve on the rinse waste water line, and a cloudy rinse waste water line and a clean rinse waste water line are controlled about a state, conductive or not conductive, according to a detection signal of the concentration meter sensor, so that cloudy rinse waste water and clean rinse waste water are recovered while being classified, not only can chemical liquid waste water and rinse waste water are recovered while being classified, but the rinse waste water is recovered as cloudy rinse waste water and clean waste water while being classified. Hence, not only can the cloudy rinse waste water be processed in a waste water processing apparatus but the clean rinse waste water can be recycled as medium grade water and the like. Therefore, according to the present invention, classifying recovery which has been regarded hard in a single wafer cleaning system of a single tank can be effected and not only is water processing cost decreased but water shortage, if it arises, can also be coped with by the effective utilization of water.

What is claim is:

1. A waste water classifying recovery apparatus recovering waste water after cleaning while classifying in a wafer cleaning system of a single tank in which a wafer is cleaned in a single treatment tank while chemical liquid and rinse steps are selectively performed, comprising: a common waste water line which is connected to the treatment tank; chemical liquid waste water and rinse waste water lines which are branched from the common waste water line; chemical liquid/rinse selective distributor automatic valves respectively provided on the chemical liquid waste water line and the rinse waste water line; a concentration meter sensor for detecting a concentration of the rinse waste water provided downstream from the distributor automatic valve on the rinse waste water line; and cloudy and clean rinse waste water lines branched from the rinse waste water line downstream from the concentration meter sensor through cloudy/clean rinse distributor automatic valves, wherein the cloudy/clean rinse distributor automatic valves are selectively operated according to a detection signal of the concentration meter sensor and thereby cloudy rinse waste water and clean rinse waste water are separately drained.

2. A waste water classifying recovery apparatus in a wafer cleaning system of a single tank according to claim 1, wherein a water quality meter sensor for detecting a water quality of the waste water is further provided on the common waste water line; the chemical liquid waste water and rinse waste water lines are branched from the common waste water line downstream from the water quality meter sensor; the chemical/rinse selective distributor automatic valves are respectively provided on the chemical liquid waste water and rinse waste water lines; and the chemical/rinse selective distributor automatic valves are controlled according to a detection signal of the water quality meter sensor so that one of the chemical liquid waste water line and the rinse waste water line is made conductive and the other is made not conductive.

* * * * *